United States Patent
Ro

(10) Patent No.: US 7,144,126 B2
(45) Date of Patent: Dec. 5, 2006

(54) CLUTCH STRUCTURE OF AUTOMATIVE MIRROR ADJUSTMENT MECHANISM

(75) Inventor: Hyuk-Joon Ro, Koyang-si (KR)

(73) Assignee: Pro Quip International Hong Kong Limited, Kowloon (HK)

( * ) Notice: Subject to any disclaimer, the term of this patent is extended or adjusted under 35 U.S.C. 154(b) by 35 days.

(21) Appl. No.: 10/984,129

(22) Filed: Nov. 8, 2004

(65) Prior Publication Data

US 2005/0099710 A1    May 12, 2005

(30) Foreign Application Priority Data

Nov. 10, 2003  (KR) .................. 10-2003-0079060
Nov. 10, 2003  (KR) .................. 10-2003-0079061

(51) Int. Cl.
*G02B 7/182* (2006.01)

(52) U.S. Cl. .................. 359/877; 74/89.14; 248/476

(58) Field of Classification Search ........... 359/872, 359/876, 877; 248/476; 74/89.14

See application file for complete search history.

(56) References Cited

U.S. PATENT DOCUMENTS 4,920,816 A * 5/1990 Inabe et al. ............ 74/89.38
4,940,321 A * 7/1990 Yoshida ................. 359/874
5,343,333 A * 8/1994 Nagayama et al. ...... 359/874
5,701,211 A * 12/1997 Perry et al. ............. 359/873

\* cited by examiner

*Primary Examiner*—Mark A. Robinson
(74) *Attorney, Agent, or Firm*—Mitchell P. Brook; Luce, Forward, Hamilton & Scripps LLP

(57) ABSTRACT

The present invention provides a clutch structure of mirror adjustment mechanism comprising a clutch driving gear with specified gear teeth formed at circumference thereof and hollow fitting chuck formed at center thereof, to be geared with the output axis of a driving motor via a gear train, whereby the fitting chuck is divided by a plurality of slits in circumferential direction and a donut-shape groove is formed collapsed between the gear teeth and the fitting chuck; a pinion gear including a protrusion at one end thereof, to be geared with a rack gear formed at one side of the adjustment member, whereby the protrusion is inserted into the inner surface of the fitting chuck; and a spring pin that provides frictional contact on the contact surface between fitting chuck of the clutch driving gear and protrusion of the pinion gear by applying bias force in radial direction while it is inserted in the groove of the clutch driving gear, or allows slip movement.

2 Claims, 5 Drawing Sheets

CLUTCH STRUCTURE OF AUTOMATIVE MIRROR ADJUSTMENT MECHANISM

TECHNICAL FIELD

The present invention relates generally to a mirror adjustment mechanism of an automobile, and in particular, to a clutch structure of mirror adjustment mechanism that allows a power drive adjustment mechanism to be easily controlled manually.

BACKGROUND OF THE INVENTION

Automotive outside mirror assemblies are automotive parts usually installed at both sides of an automobile right ahead of the two front doors to allow a driver to view the traffic conditions at both sides as well as at rear side of the automobile without the need of turning his neck.

Such an outside mirror assembly comprises in the housing thereof an adjustment mechanism that allows the driver in the cabin to control the mirror to direct upward/downward and/or leftward/rightward, and the mirror adjustment mechanism can be classified into a power drive type that requires a power supply and a manual drive type that is driven manually by a driver.

A power drive type mirror adjustment mechanism comprises a mirror position controller installed in the cabin, two driving motors each of which is electrically connected to the above position controller, two adjustment members each of which is geared with the corresponding driving motor via a transmission mechanism such as gear train to control position of the mirror, and sensors that sense position of the mirror while connected to a transmission mechanism between the driving motors and the adjustment members, and then, transmit signals of the sensed position to the mirror position controller.

Although the above power drive type mirror adjustment mechanism adjusts position of the mirror by moving the two adjustment members separately driven by power of the driving motors, there can be situations where the mirror needs to be adjusted manually. Thus, a power drive mirror adjustment mechanism shall preferably provide manual adjustment function in addition to its ability to correctly adjust position of the mirror by power driving.

Accordingly, a conventional power drive type mirror adjustment mechanism adopts a clutch structure that enables transmission of driving power of the driving motor to an adjustment member by frictional contact when the mirror adjustment mechanism is driven by power, and also enables manual adjustment of the mirror by generating a slip movement between the driving motor and the adjustment member when the mirror is adjusted manually.

A variety of such conventional clutch structures of a mirror adjustment mechanism have been suggested in ratchet type, rack and pinion type, etc.

Problems with the above ratchet type clutch structure are that it produces various operation noises and that its manual adjustability is strongly lowered as adjustments of the mirror position are made incrementally.

To overcome these drawbacks of the ratchet type clutch structures, rack and pinion type clutch structures have been introduced, which enable soft and easy adjustments of a mirror position with less noise when the mirror is adjusted manually.

A conventional rack and pinion type clutch structure comprises a clutch driving gear to be geared with specific gear train from the output axis of a driving motor, a pinion gear that comes in contact with one end of the clutch driving gear frictionally, an adjustment member including a rack gear that is geared with the pinion gear, and a spring member that provides frictional contact by endowing bias force in axial direction on contacting surface of the clutch driving gear with the pinion gear when the mirror is adjusted by power driving, and allows relative slip movements on contacting surface of the clutch driving gear with the pinion gear when the mirror is adjusted manually.

In such a rack and pinion clutch structure, frictional contact is generated on contacting surface of the clutch driving gear with the pinion gear by bias force of the spring member when the mirror is adjusted by power driving, and relative slip movements are generated on contacting surface of the clutch driving gear with the pinion gear as the pinion gear overcomes the frictional contact force (i.e. bias force in axial direction of the spring member) when the mirror is adjusted manually, as described above.

However, a problem with the conventional rack and pinion type clutch structure is that its adjustability at power drive is lowered due to insufficient power transmission at power driving. Since one side cross-section of the clutch driving gear and of the pinion gear are designed to contact each other in axial direction, the contacting surface generated hereby remains relatively small, and thus, frictional contact force generated on the contacting surface remains also small.

Another problem with the conventional rack and pinion type clutch structure is that this clutch structure requires various parts to be installed and large space because the clutch driving gear and the pinion gear are arranged in axial direction, and the installed structure thereof is complicated.

Consequently, this structure requires various parts to be installed in a relatively small space of the mirror adjustment mechanism, leading to the necessity of minimization and precision of the parts, whereby cost for manufacture of the parts arises and assembly of the parts becomes difficult.

SUMMARY OF THE INVENTION

The present invention, being conceived to solve the above problems, aims to provide a clutch structure of a mirror adjustment mechanism) capable of transmitting power effectively by enlarging the contacting surface of the clutch driving gear with the pinion gear, requiring a smaller installation space due to its simple construction, and also reducing manufacturing costs.

In order to achieve the above objects, a first embodiment example of the present invention provides a mirror adjustment mechanism comprising a mirror position controller installed in the cabin of an automobile, two driving motors each of which is electrically connected to the above mirror position controller, two adjustment members each of which is geared with the corresponding driving motor via a gear train to control position of the mirror, and sensors that sense position of the mirror while connected to the gear train between the driving motors and the adjustment members, and then, transmit signals of the sensed position to the mirror position controller, wherein the mirror adjustment mechanism includes a clutch structure comprising a clutch driving gear with specified gear teeth formed at circumference thereof and hollow fitting chuck formed at center thereof to be geared with the output axis of the driving motor via the gear train, whereby the fitting chuck is divided in circumferential direction by a plurality of slits and a donut-shape groove is formed collapsed between the gear teeth and the fitting chuck; a pinion gear including a protrusion at one end thereof to be geared with a rack gear formed at one side of the adjustment member, whereby the protrusion is inserted into the inner surface of the fitting chuck; and a spring pin that provides frictional contact on the contact surface between fitting chuck of the clutch driving gear and protrusion of the pinion gear by applying bias force in radial direction while it is inserted in the groove of the clutch driving gear, or allows slip movement, Preferably, the fitting chuck of clutch driving gear comprises a separation prevention protrusion formed on inner surface thereof in circumferential direction that fits into the corresponding separation prevention groove formed on circumference of the protrusion of the pinion gear.

A second embodiment example of the present invention provides a mirror adjustment mechanism comprising a mirror position controller installed in the cabin of an automobile, two driving motors each of which is electrically connected to the above position controller, two adjustment members each of which is geared with the corresponding driving motor via a gear train to control position of the mirror, and sensors that sense position of the mirror while connected to the gear train between the driving motors and the adjustment members, and then, transmit signals of the sensed position to the mirror position controller, wherein the mirror adjustment mechanism includes a clutch structure comprising a clutch driving gear with specified gear teeth formed at circumference thereof and hollow fitting chuck formed at center thereof, to be geared with the output axis of the driving motor via the gear train, whereby the fitting chuck is divided in circumferential direction by a plurality of slits and a donut-shape groove with a slope is formed collapsed between the gear teeth and the fitting chuck; a pinion gear including a protrusion at one end thereof to be geared with the rack gear formed at one side of the adjustment member, whereby the protrusion is inserted into the inner surface of the fitting chuck, while center of the pinion gear accepts a spring member that apply compression force in axial direction; and a pressure member having a wedge-shape cross-section corresponding to the groove slope of the clutch driving gear, whereby the pressure member provides frictional contact on the contact surface between fitting chuck of the clutch driving gear and protrusion of the pinion gear by applying compression force in radial direction while it is inserted in the groove of the clutch driving gear, or allows slip movement.

Preferably, the fitting chuck of clutch driving gear comprises a separation prevention protrusion formed on inner surface thereof in circumferential direction that fits into the corresponding separation prevention groove formed on circumference of the protrusion of the pinion gear.

Alternatively, each contact surface of the pressure member and the protrusion of the pinion gear can be provided with a fitting protrusion or a fitting groove separately to allow a combination of the pressure member with the corresponding protrusion of the pinion gear by insertion.

DETAILED DESCRIPTION OF THE INVENTION

The preferred embodiments of the present invention are described below in detail making reference to the accompanying drawings.

Figure 1:
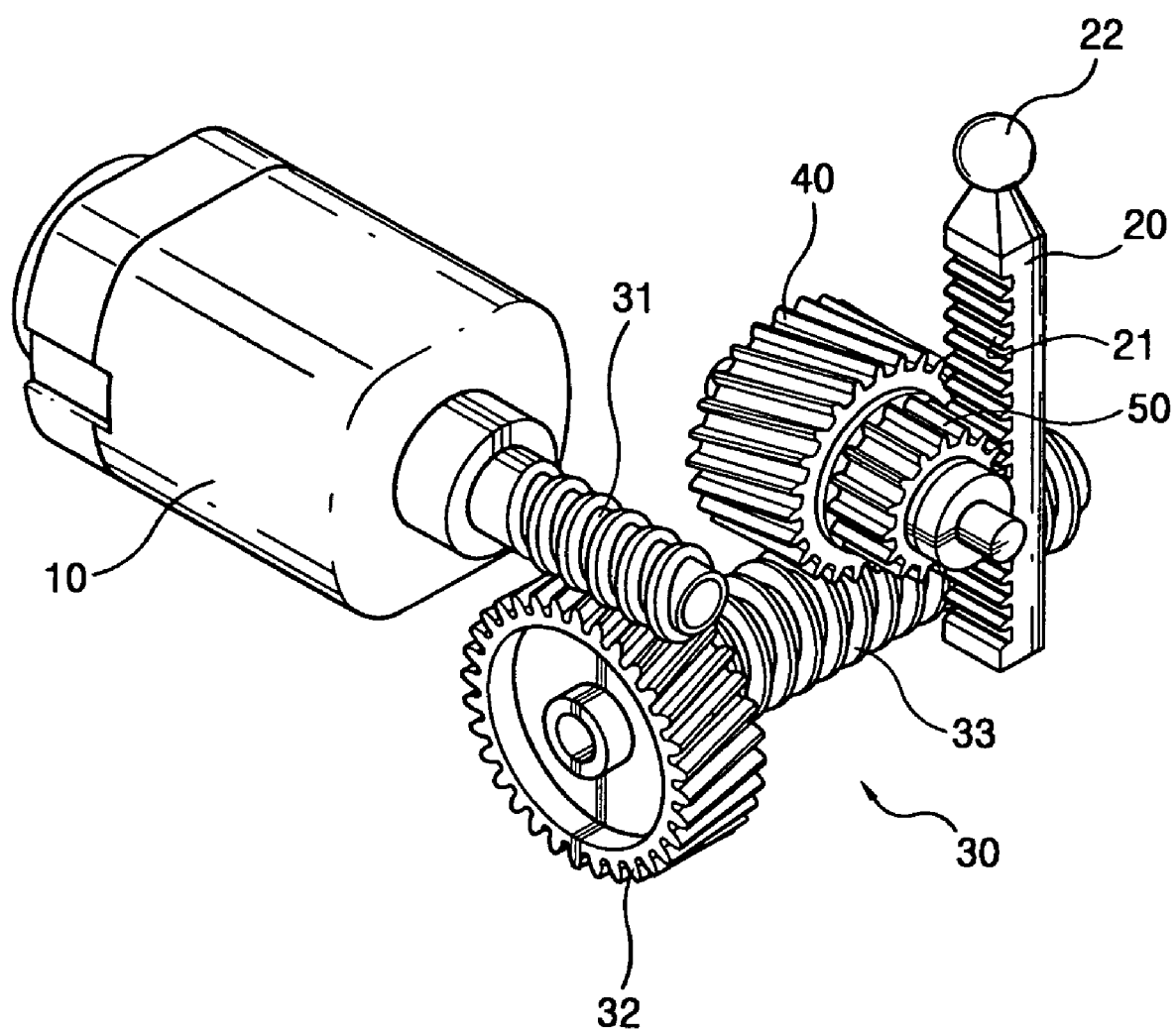
FIG. 1 is a perspective view of an automotive mirror adjustment mechanism adopting a clutch structure in accordance with the present invention.

As shown in FIG. 1, a power drive type mirror adjustment mechanism generally comprises a mirror position controller (not shown) installed in the cabin, two driving motors 10 each of which is electrically connected to the above position controller (not shown), two adjustment members 20 each of which is geared with the corresponding driving motor 10 via a gear train 30 to control position of the mirror, and sensors (not shown) that sense position of the mirror while connected to the gear train 30 between the driving motors 10 and the adjustment members 20, and then, transmit signals of the sensed position to the mirror position controller (not shown).

The mirror position controller (not shown), which is installed at a specified position in the cabin to be remotely controlled by a driver or a guest, controls the driving motors 10 in a manner that rotating position of the mirror holder (not shown), in which a mirror (not shown) is fixed, is adjusted.

The two driving motors 10 are installed in housing (not shown) of mirror assembly, and then, electrically connected to the above mirror position controller (not shown).

The two adjustment members 20 are installed in housing (not shown) of mirror assembly, and then, geared with the driving motors 10 through the specified gear train 30; with rack gear teeth 21 formed on one side thereof. Each adjustment member 20 is joint combined with the mirror holder (not shown) by inserting the ball joint 22 formed at upper part thereof into a corresponding hole of the mirror holder (not shown).

Figure 2:
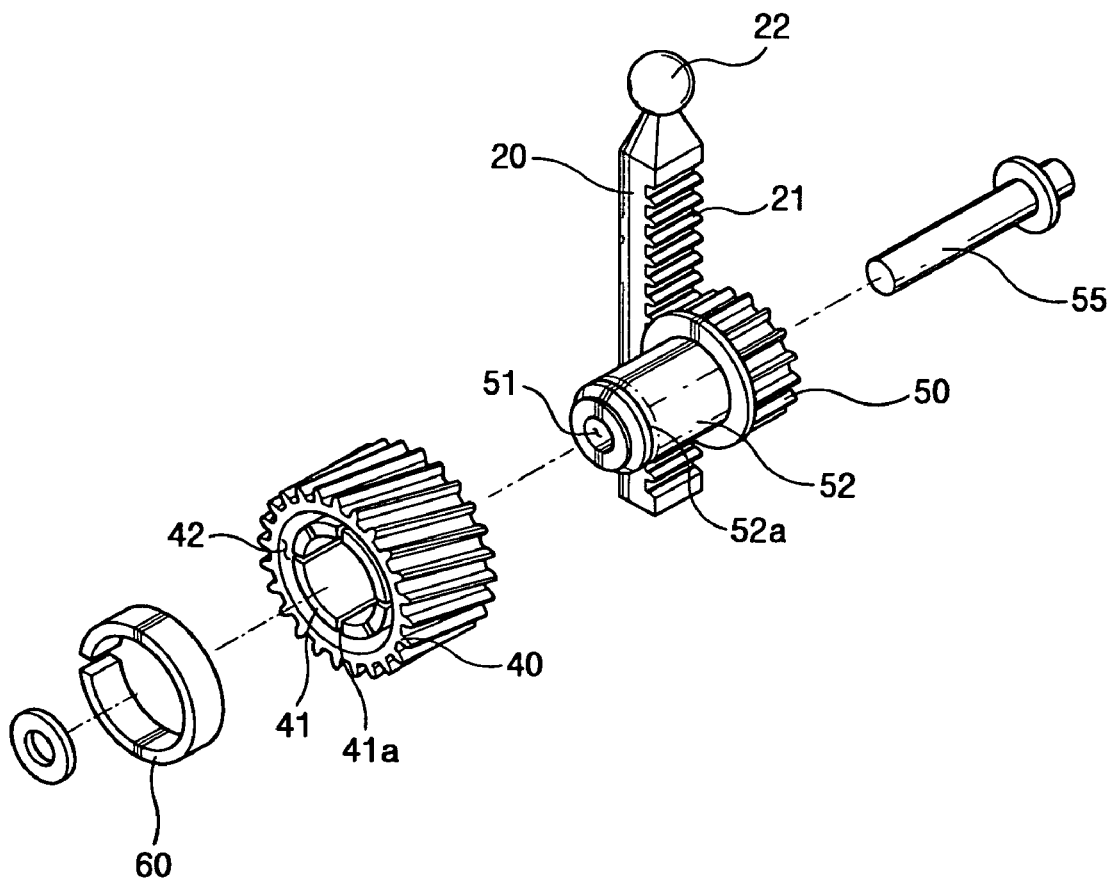
FIG. 2 is an exploded perspective view of a clutch structure in accordance with the first embodiment example of the present invention.
Figure 3:
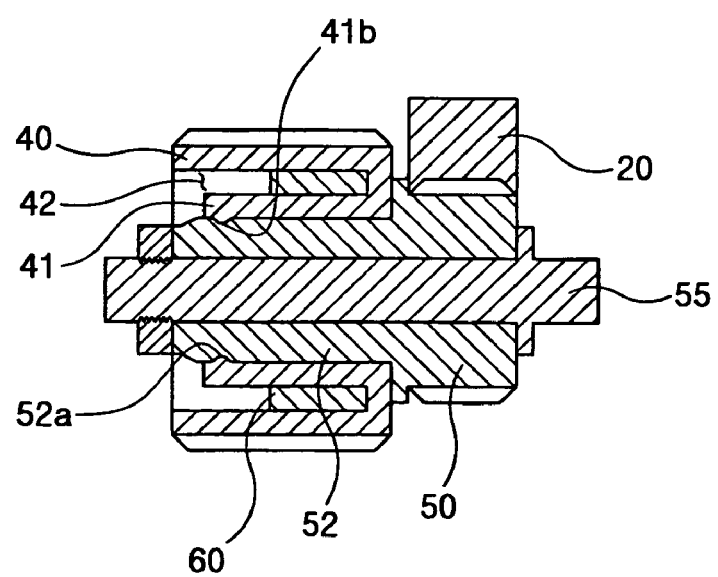
FIG. 3 is a cross-sectional view of a combined clutch structure in accordance with the first embodiment example of the present invention.

FIGS. 2 and 3 show a clutch structure in accordance with the first embodiment example of the present invention.

As shown in the drawings, a clutch structure in accordance with the first embodiment example of the present invention comprises a clutch driving gear 40 geared with the driving motor 10 through the specified gear train 30 and a pinion gear 50 geared with the rack gear teeth 21 of the adjustment member 20.

As exemplified in FIG. 1, the specified gear train 30 consists of a first worm screw 31 provided on the output axis of the driving motor 10, a driving gear 32 which is geared with the first worm screw 31, and a second worm screw 33 which is fixed coaxially with the driving gear 32, whereby the second worm screw 33 is geared with the clutch driving gear 40.

The clutch driving gear 40 is equipped with specified gear teeth formed at circumference thereof and hollow fitting chuck 41 formed at center thereof, whereby the fitting chuck 41 is divided in circumferential direction by a plurality of slits 41a and a donut-shape groove 42 is formed collapsed between the fitting chuck 41 and the gear teeth.

The pinion gear 50, comprising a through hole 51 formed at center thereof, the through hole 51 being installed rotatably on the fixing axis 55 fixed on the housing (not shown) of the mirror assembly, includes a protrusion 52 at one end thereof whereby the protrusion 52 is inserted into the inner through bore of the fitting chuck 41 of the clutch driving gear 40. The gear teeth formed at the other end of the pinion gear 50 are geared with the rack gear teeth 21 formed at one end of the adjustment member 20.

Preferably, fitting chuck 41 of the clutch driving gear 40 comprises a separation prevention protrusion 41b formed on inner surface thereof in circumferential direction, and protrusion 52 of the pinion gear 50 comprises a corresponding separation prevention groove 52a on circumference thereof so that a separation of the fitting chuck 41 from the protrusion 52 of said pinion gear 50 can be prevented.

As the spring pin 60 is combined with the donut-shape groove 42 of the clutch driving gear 40 while protrusion 52 of the pinion gear 50 is fitted into fitting chuck 41 of the clutch driving gear 40, the divided fitting chuck 41 of the clutch driving gear 40 is tightened by bias force of the spring pin 60, whereby the spring pin 60 provides frictional contact on the contact surface between fitting chuck 41 of the clutch driving gear 40 and protrusion 52 of the pinion gear 52 (i.e. between inner surface of the fitting chuck 41 and circumference of the protrusion 52), or allows slip movement.

Now, a description of operation of the first embodiment example having the above construction is given below.

In case the mirror is adjusted by power drive, if a rotating position of the mirror holder (not shown) is sensed by a sensor (not shown) for sensing rotating position of the mirror, one or more such rotating position data are stored in the mirror position controller (not shown), whereupon the mirror position controller (not shown) drives each driving motor 10 in order to move the mirror holder (not shown) to a desired position referring to the stored position information by selecting control signals separately and by sensing the rotating position of the mirror holder.

Then, driving power of each driving motor 10 is transmitted to the clutch driving motor 40 through the gear train 30, and a frictional contact force is provided between inner surface of the fitting chuck 41 and circumference of the protrusion 52 as the spring pin 60 applies bias force to contacting surface between fitting chuck 41 of the clutch driving gear 40 and protrusion 52 of the pinion gear 50 in radial direction.

As a result, the driving power transmitted to the clutch driving gear 40 is further transmitted to the adjustment member 20 via the pinion gear 50, such that the adjustment member 20 is moved to further move the mirror holder (not shown) to a desired rotating position.

In case the mirror is adjusted manually, if a driver moves the mirror holder (not shown) to a desired rotating position using his hand, the adjustment member 20 makes a corresponding movement, whereupon the geared pinion gear 50 makes a corresponding movement.

Here, the load created by manual adjustment of the mirror overcomes the bias force applied to the contacting surface between fitting chuck 41 of the clutch driving gear 40 and protrusion 52 of the pinion gear 50 (i.e. between inner surface of the fitting chuck 41 and circumference of the protrusion 52) in radial direction, and a slip movement is provided between the fitting chuck 41 and the protrusion 52.

Due to the slip movement between the pinion gear 50 and the clutch driving gear 40, the pinion gear 50 idles and the load caused by manual adjustment of the mirror is not transmitted from the pinion gear 50 to the driving motor 10.

Figure 4:
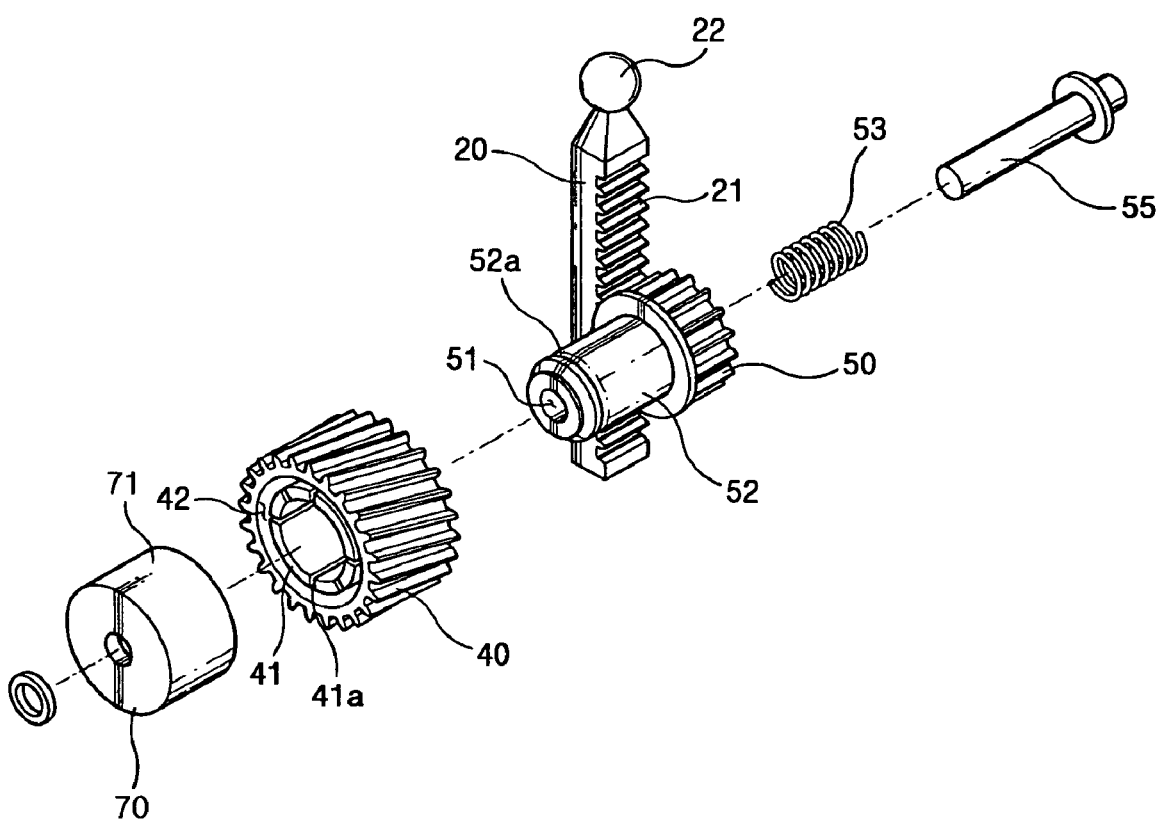
FIG. 4 is an exploded perspective view of a clutch structure in accordance with the second embodiment example of the present invention.
Figure 5:
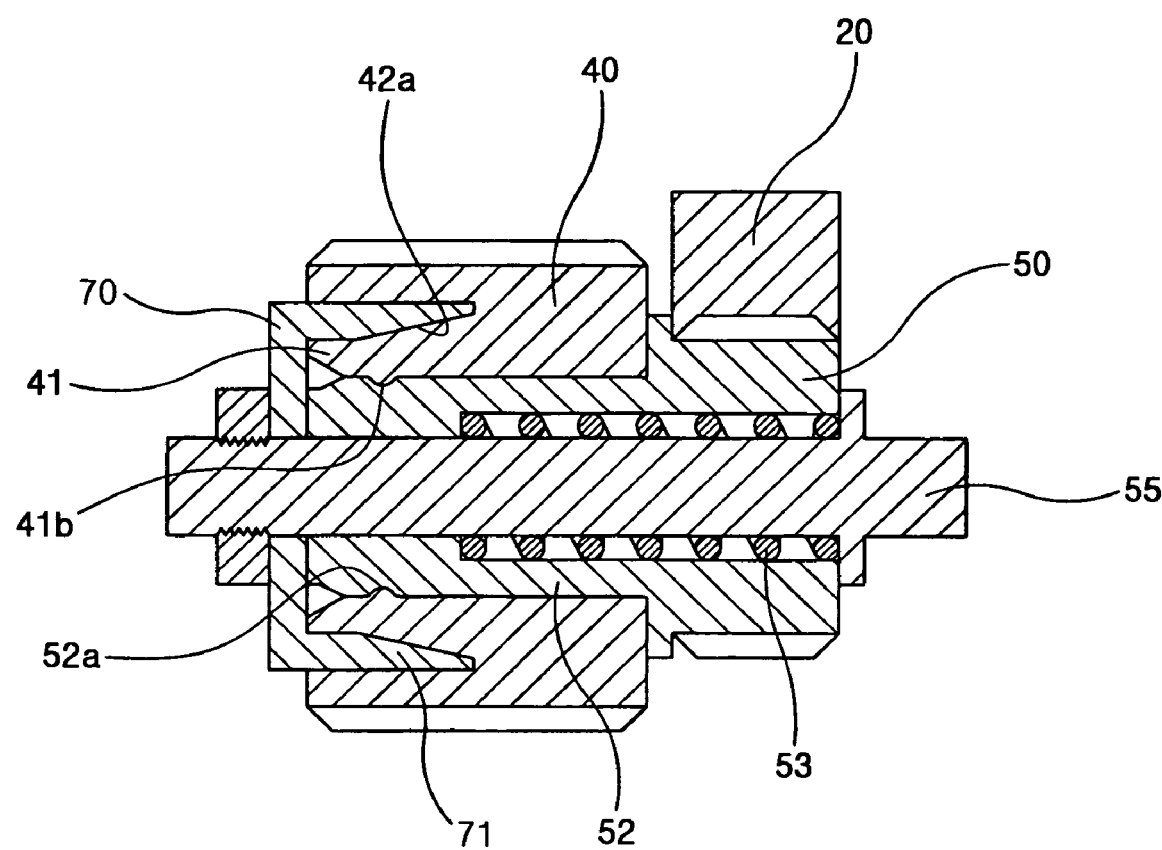
FIG. 5 is a cross-sectional view of a combined clutch structure in accordance with the second embodiment example of the present invention.

FIGS. 4 and 5 show a clutch structure in accordance with the second embodiment example of the present invention.

As shown in the drawings, a clutch structure in accordance with the second embodiment example of the present invention comprises a clutch driving gear 40 geared with the driving motor 10 through the specified gear train 30 and a pinion gear 50 geared with the rack gear teeth 21 of an adjustment member 20.

As exemplified in FIG. 1, the specified gear train 30 consists of a first worm screw 31 provided on the output axis of the driving motor 10, a driving gear 32 which is geared with the first worm screw 31, and a second worm screw 33 which is fixed coaxially with the driving gear 32, whereby the second worm screw 33 is geared with the clutch driving gear 40.

Figure 6:
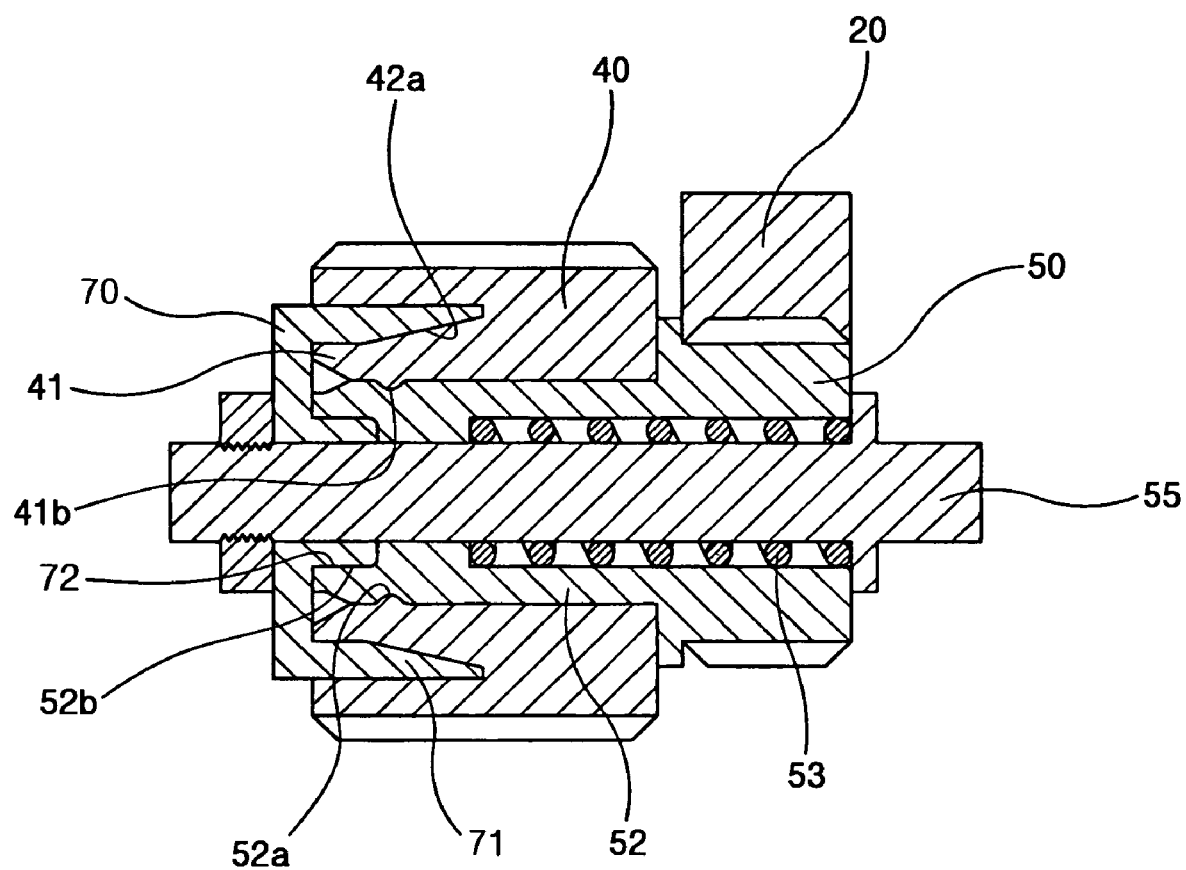
FIG. 6 is a cross-sectional view of a combined clutch structure alternative to the second embodiment example of the present invention.

The clutch driving gear 40 is equipped with specified gear teeth formed at circumference thereof and hollow fitting chuck 41 formed at center thereof, whereby the fitting chuck 41 is divided in circumferential direction by a plurality of slits 41a and a donut-shape groove 42 with a slope 42a is formed collapsed around the fitting chuck 41. Here, the slope 42a may be formed at any side of the groove 42, for example, the slope 42a can be formed at contact surface with circumference of the fitting chuck 41 as illustrated in FIGS. 5 and 6, or it can be formed at contact surface with inner surface of the fitting chuck 41.

The pinion gear 50, having a through hole 51 formed at center thereof, the through hole 51 being installed rotatably on the fixing axis 55 fixed on the housing (not shown) of the mirror assembly, comprises between the fixing axis 55 and the through hole 51 of the pinion gear 50 a spring member 53 that applies compression force in axial direction. The pinion gear 50 includes a protrusion 52 at one end thereof, whereby the protrusion 52 is inserted into the inner through bore of the fitting chuck 41 of the clutch driving gear 40. The gear teeth formed at the other end of the pinion gear 50 are geared with the rack gear teeth 21 formed at one end of the adjustment member 20.

The pressure member 70 is firmly installed to the fixing axis 55 accommodating the pinion gear 50 using a clamping means such as a nut, etc., whereby the pinion gear 50, the clutch driving gear 40, and the pressure member 70 are constrained in the axial direction. A wedge 71 having a wedge-shape cross-section corresponding to the slope 42a of the groove 42 of the clutch driving gear 40 is formed at one end of the pressure member 70.

As protrusion 52 of the pinion gear 50 is inserted into fitting chuck 41 of the clutch driving gear 40 while the pinion gear 50 and the pressure member 70 are fixed to the fixing axis 55, compression force is applied in axial direction to the spring member 53 provided at center of the pinion gear 50, whereupon wedge 71 of the pressure member 70 is inserted into slope 42a of the groove 42 of the clutch driving gear 40 by the compression force in axial direction of the spring member 53, and then, fitting chuck 41 of the clutch driving gear 40 is tightened due to the compression force applied by wedge 71 of the pressure member 70 in radial direction of fitting chuck 41 of the clutch driving gear 40, whereby frictional contact force is provided on contact surface between fitting chuck 41 of the clutch driving gear 40 and protrusion 52 of the pinion gear 50 (i.e. between inner surface of the fitting chuck 41 and circumference of the protrusion 52).

Preferably, fitting chuck 41 of the clutch driving gear 40 comprises a separation prevention protrusion 41b formed on inner surface thereof in circumferential direction, and protrusion 52 of the pinion gear 50 comprises a corresponding separation prevention groove 52a on circumference thereof so that a separation of the fitting chuck 41 from the protrusion 52 of said pinion gear 50 can be prevented.

Alternatively, each contact surface of the pressure member 70 and the protrusion 52 of the pinion gear 50 can be provided with a fitting protrusion 72 and a fitting groove 52b separately to allow a combination of the pressure member 70 with the corresponding protrusion 52 of the pinion gear 50 by insertion. For example, a fitting protrusion 72 can be formed on inner contact surface of the pressure member 70 and a corresponding fitting groove 52b can be formed at contact end of the protrusion 52 of the pinion gear 50 to allow a combination of the pressure member 70 with the pinion gear 50 by insertion.

By this combination structure of the pressure member 70 with the pinion gear 50, more frictional contact force as well as compression force is applied between wedge 71 of the pressure member 70 and slope 42a of the groove 42 of the clutch driving gear 40, so that the total frictional contact force of the clutch driving gear 40 is increased. In other words, by applying additional frictional contact force to the slope 42a between wedge 71 of the pressure member 70 and groove 42 of the clutch driving gear 40 in addition to frictional contact force applied to contact surface between fitting chuck 41 of the clutch driving gear 40 and protrusion 52 of the pinion gear 50 (i.e. between inner surface of the fitting chuck 41 and circumference of the protrusion 52), the total frictional contact force between the clutch driving gear 40 and the pinion gear 20 is increased so that an improved power transmission at power driving mode can be achieved.

However, a fitting combination structure of a pressure member 70 with a pinion gear 50 in accordance with the present invention is not limited to the embodiments illustrated in FIG. 6 or described above, but rather, includes any other variations that can increase frictional contact force between the pressure member 70 and the pinion gear 50 by combining these parts together through fitting.

Now, a description of operation of the second embodiment example having the above construction is given below.

In case the mirror is adjusted by power drive, if a rotating position of the mirror holder (not shown) is sensed by a sensor (not shown) for sensing rotating position of the mirror, one or more such rotating position data are stored in advance in the mirror position controller (not shown), whereupon the mirror position controller (not shown) drives each driving motor 10 in order to move the mirror holder (not shown) to a desired position referring to the stored position information by selecting control signals separately and by sensing rotating position of the mirror holder.

Then, driving power of each driving motor 10 is transmitted to the clutch driving motor 40 through the gear train 30, and a frictional contact force is provided on contacting surface between inner surface of the fitting chuck 41 and circumference of the protrusion 52 as compression force is applied on contacting surface between fitting chuck 41 of the clutch driving gear 40 and protrusion 52 of the pinion gear 50 in radial direction due to the compression force in radial direction from the pressure member 70.

As a result, the driving power transmitted to the clutch driving gear 40 is further transmitted to the adjustment member 20 via the pinion gear 50, such that the adjustment member 20 is moved to further move the mirror holder (not shown) to a desired rotating position.

In case the mirror is adjusted manually, if a driver moves the mirror holder (not shown) to a desired rotating position using his hand, the adjustment member 20 makes a corresponding movement, whereupon the geared pinion gear 50 makes a corresponding movement.

Here, the load created by manual adjustment of the mirror overcomes the frictional contact force applied to the contacting surface between fitting chuck 41 of the clutch driving gear 40 and protrusion 52 of the pinion gear 50 (i.e. between inner surface of the fitting chuck 41 and circumference of the protrusion 52) in radial direction, and a slip movement is allowed between the fitting chuck 41 and the protrusion 52.

Due to the slip movement between the pinion gear 50 and the clutch driving gear 40, the pinion gear 50 idles and the load caused by manual adjustment of the mirror is not transmitted from the pinion gear 50 to the driving motor 10.

As described above, the present invention, by providing a highly increased contacting area between fitting chuck 41 of a clutch driving gear 40 and protrusion 52 of a pinion gear 50, enables to overcome a drawback of the conventional art, wherein a relatively small such contacting surface is provided, and thus, power transmission at power drive is not efficient, resulting in a poor adjustability at power drive.

Accordingly, the present invention provides a clutch structure for mirror adjustment mechanism capable of effectively transmitting power by enlarging contacting surface of the clutch driving gear with the pinion gear, requiring a smaller installation space due to its simple construction, and also reducing manufacturing costs.

Although the present invention has been described above with respect to the preferred embodiments, the scope of rights of the present invention is not limited thereto, but rather shall be determined by the appended claims and their equivalents, allowing various modifications, adaptations, etc. as those skilled in the art will understand.

What is claimed is:

1. An automotive mirror adjustment mechanism comprising a mirror position controller installed in the cabin of an automobile, two driving motors each of which is electrically connected to said mirror position controller, two adjustment members each of which is geared with the corresponding driving motor via a gear train to control position of the mirror, and sensors that sense position of said mirror while connected to the gear train between said driving motors and said adjustment members, and then, transmit signals of the sensed position to said mirror position controller, wherein the automotive mirror adjustment mechanism includes a clutch structure comprising, a clutch driving gear with specified gear teeth formed at circumference thereof and hollow fitting chuck formed at center thereof, to be geared with an output axis of the driving motor via the gear train, whereby said fitting chuck is divided by a plurality of slits in circumferential direction and a donut-shape groove is formed collapsed between said gear teeth and said fitting chuck;

a pinion gear including a protrusion at one end thereof, to be geared with a rack gear teeth formed at one side of the adjustment member, whereby said protrusion is inserted into the inner surface of said fitting chuck of the clutch driving gear; and a spring pin that provides frictional contact on contact surface between said fitting chuck of said clutch driving gear and said protrusion of said pinion gear by applying bias force in radial direction while said spring pin is inserted in said groove of said clutch driving gear, or allows slip movement.

2. The automotive mirror adjustment mechanism of claim 1, wherein said fitting chuck of clutch driving gear comprises a separation prevention protrusion formed on inner surface thereof in circumferential direction that fits into the corresponding separation prevention groove formed on circumference of said protrusion of said pinion gear.

* * * * *